US010366197B2

(12) United States Patent
Rose et al.

(10) Patent No.: US 10,366,197 B2
(45) Date of Patent: Jul. 30, 2019

(54) COUPLING AWARE WIRE CAPACITANCE ADJUST AT GLOBAL ROUTING

(71) Applicant: International Business Machines Corporation, Armonk, NY (US)

(72) Inventors: Ronald D. Rose, Essex Junction, VT (US); Vladimir Zolotov, Putnam Valley, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 691 days.

(21) Appl. No.: 14/973,631

(22) Filed: Dec. 17, 2015

(65) Prior Publication Data

US 2017/0177781 A1 Jun. 22, 2017

(51) Int. Cl.
*G06F 17/50* (2006.01)

(52) U.S. Cl.
CPC ...... *G06F 17/5077* (2013.01); *G06F 17/5072* (2013.01); *G06F 17/5081* (2013.01); *G06F 2217/82* (2013.01); *G06F 2217/84* (2013.01)

(58) Field of Classification Search
USPC ........................................................ 716/115
See application file for complete search history.

(56) References Cited

U.S. PATENT DOCUMENTS

| 6,601,222 | B1 | 7/2003 | Mehrotra et al. |
| 6,951,005 | B1 | 9/2005 | Teig et al. |
| 7,137,097 | B1 | 11/2006 | Aji et al. |
| 8,966,425 | B1 | 2/2015 | Eisenstadt et al. |
| 2005/0012509 | A1 | 1/2005 | Amarao et al. |
| 2005/0132309 | A1 | 6/2005 | Saxena et al. |

(Continued)

FOREIGN PATENT DOCUMENTS

| EP | 001986339 A1 | 10/2008 |
| WO | 2008085530 A1 | 7/2008 |
| WO | 2011028343 A2 | 3/2011 |

OTHER PUBLICATIONS

Kastner et al.,; "Coupling aware routing." In ASIC/SOC Conference, 2000. Proceedings. 13th Annual IEEE International pp. 392-396. IEEE, 2000.

(Continued)

*Primary Examiner* — Eric D Lee
(74) *Attorney, Agent, or Firm* — Law Offices of Ira D. Blecker, P.C.

(57) ABSTRACT

A computer implemented method for calculating a ground capacitance adjust for a wire segment going through a given routing tile. The method includes providing the routing tile having a plurality of wires wherein the wire segment being a victim wire and neighboring wires being aggressor wires; computing ground capacitance adjusts for a victim wire averaged across all aggressor slew values and across possible spacing values between the victim wire and the neighboring aggressor wires to take into account a potential coupling effect by the neighboring aggressor wires, assuming a distribution of signal slews of wires belonging to the routing tile and assuming the victim wire's neighbors have signal slews from the distribution of slews for this tile for possible spacing values responsible for the coupling effect, to guide placement of the wire segment in the routing tile to avoid coupling noise.

23 Claims, 6 Drawing Sheets

(56) References Cited

U.S. PATENT DOCUMENTS

2008/0209376 A1 8/2008 Kazda et al.
2008/0243414 A1* 10/2008 Oh .................... G06F 17/5036
702/85
2008/0313588 A1 12/2008 Buehler et al.

OTHER PUBLICATIONS

Wu et al.; "Coupling aware timing optimization and antenna avoidance in layer assignment." In Proceedings of the 2005 international symposium on Physical design, pp. 20-27. ACM, 2005.
Morton et al., "An Efficient Sequential Quadratic Programming Formulation of Optimal Wire Spacing for Cross-Talk Noise Avoidance Routing", ISPD '99 Proceedings of the 1999 international symposium on Physical design, 1999, all pages.
Chen et al., "Miller Factor for Gate-Level Coupling Delay Calculation", IEEE/ACM International Conference on Computer Aided Design 2000, Nov. 5-9, 2000 , all pages.

* cited by examiner

COUPLING AWARE WIRE CAPACITANCE ADJUST AT GLOBAL ROUTING

BACKGROUND

The present exemplary embodiments pertain to integrated circuit design, and, in particular, to avoiding coupled noise during global routing.

As computer speeds have increased, and semiconductor technology dimensions have decreased, coupled noise effects on timing have correspondingly worsened. In addition, newer semiconductor technologies employ reduced lithography dimensions. The smaller shape sizes have resulted in reduced spacing between wires, and increased capacitive coupling between nets within integrated circuits.

Advanced semiconductor technologies are becoming increasingly susceptible to coupled noise. Under the right circumstances of signal-to-signal synchronicity, a given amount of coupled noise energy results in a corresponding delay impact on signal timing. The probability that this change in delay will result in a timing violation increases as machine speeds increase and cycle times decrease.

Semiconductor chip (hereafter just "chip") interconnects drastically affect the performance and function of advanced chips, with capacitances the most limiting factor. It is important to accurately predict and avoid factors that may negatively affect the performance or function of a chip.

Capacitive coupling and noise (i.e., crosstalk) must be contained for the chips to work with the desired performance and function. Coupling noise analysis methods often require lengthy extraction and simulations steps, and require the designer to iterate back over a design to correct problems found in analysis. Any effort to avoid noise while in the chip construction steps may prove to be very beneficial to the designer, by creating correct-by-construction circuits which do not require several iterations of analysis and fixup, thereby reducing the design cycle.

BRIEF SUMMARY

The various advantages and purposes of the exemplary embodiments as described above and hereafter are achieved by providing, according to one aspect of the exemplary embodiments, a computer implemented method for calculating a ground capacitance adjust for a wire segment going through a given routing tile comprising: providing the routing tile having a plurality of wires wherein the wire segment being a victim wire and neighboring wires being aggressor wires; computing a plurality of ground capacitance adjusts for the victim wire averaged across a plurality of aggressor slew values and across a plurality of spacing values between the victim wire and the neighboring aggressor wires to take into account a potential coupling effect by the neighboring aggressor wires, assuming a distribution of signal slews of wires belonging to the routing tile and assuming the neighboring wires of the victim wires have signal slews from the distribution of slews for the routing tile for the plurality of spacing values responsible for the coupling effect, to guide placement of the wire segment in the routing tile to avoid coupling noise.

According to another aspect of the exemplary embodiments, there is provided a computer implemented method for calculating a ground capacitance adjust for a wire segment going through a given routing tile comprising: providing the routing tile having a plurality of wires wherein the wire segment being a victim wire and neighboring wires being aggressor wires; computing a plurality of ground capacitance adjusts for the victim wire averaged across a plurality of aggressor slew values to take into account a potential coupling noise effect by neighbors of the victim wire assuming a distribution of signal slews of wires belonging to the routing tile and assuming the victim wire's neighbors have signal slews from the distribution of slews for the routing tile for a plurality of spacing values of single spacing ($C_{ASS}$), double spacing ($C_{ADS}$) and mixed spacing of single and double spacing ($C_{AMS}$); computing a first probability, $P_{SS}$, that the victim wire will have neighboring wires on the routing tile with those signal slews and located with a single spacing; computing a second probability, $P_{DS}$, that the victim wire will have neighboring wires on the routing tile with those signal slews and located with a double spacing; computing a third probability, $P_{MS}$, that the victim wire will have neighboring wires on the routing tile with those signal slews and located with mixed spacing; computing a first product of the computed ground capacitance adjust for the single spacing multiplied by the first probability; computing a second product of the computed ground capacitance adjust for the double spacing multiplied by the second probability; computing a third product of the computed ground capacitance adjust for the mixed spacing multiplied by the third probability; computing an average value of ground capacitance adjust, $C_{AVS}$, by summing the first product, second product and the third product; and inputting the average value of ground capacitance adjust into a tool to guide placement of the wire segment in the routing tile to avoid coupling noise.

According to a further aspect of the exemplary embodiments, there is provided a computer program product for calculating a ground capacitance adjust for a wire segment going through a given routing tile having a plurality of wires such that one wire is a victim wire and at least one wire is an aggressor wire, the computer program product comprising a computer readable storage medium having program instructions embodied therewith, the program instructions executable by a computer processing device to cause the computer processing device to perform a method comprising: computing a plurality of ground capacitance adjusts for the victim wire averaged across a plurality of aggressor slew values to take into account a potential coupling noise effect by neighbors of the victim wire assuming a distribution of signal slews of wires belonging to the routing tile and assuming the victim wire's neighbors have signal slews from the distribution of slews for the routing tile for possible spacing values of single spacing ($C_{ASS}$), double spacing ($C_{ADS}$) and mixed spacing of single and double spacing ($C_{AMS}$); computing a first probability, $P_{SS}$, that the victim wire will have neighboring wires on the routing tile with those signal slews and located with a single spacing; computing a second probability, $P_{DS}$, that the victim wire will have neighboring wires on the routing tile with those signal slews and located with a double spacing; computing a third probability, $P_{MS}$, that the victim wire will have neighboring wires on the routing tile with those signal slews and located with a mixed spacing; computing a first product of the computed ground capacitance adjust for the single spacing multiplied by the first probability; computing a second product of the computed ground capacitance adjust for the double spacing multiplied by the second probability; computing a third product of the computed ground capacitance adjust for the mixed spacing multiplied by the third probability; computing an average value of ground capacitance adjust, $C_{AVS}$, by summing the first product, second product and the third product; and inputting the average value of ground capacitance adjust into a tool to guide placement of the wire segment in the routing tile to avoid coupling noise.

BRIEF DESCRIPTION OF SEVERAL VIEWS OF THE DRAWINGS

The features of the exemplary embodiments believed to be novel and the elements characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION

The present inventors have found that, given certain characteristics from the router and early timing analysis, adverse coupling may be avoided with metrics driving global routing.

Figure 6:
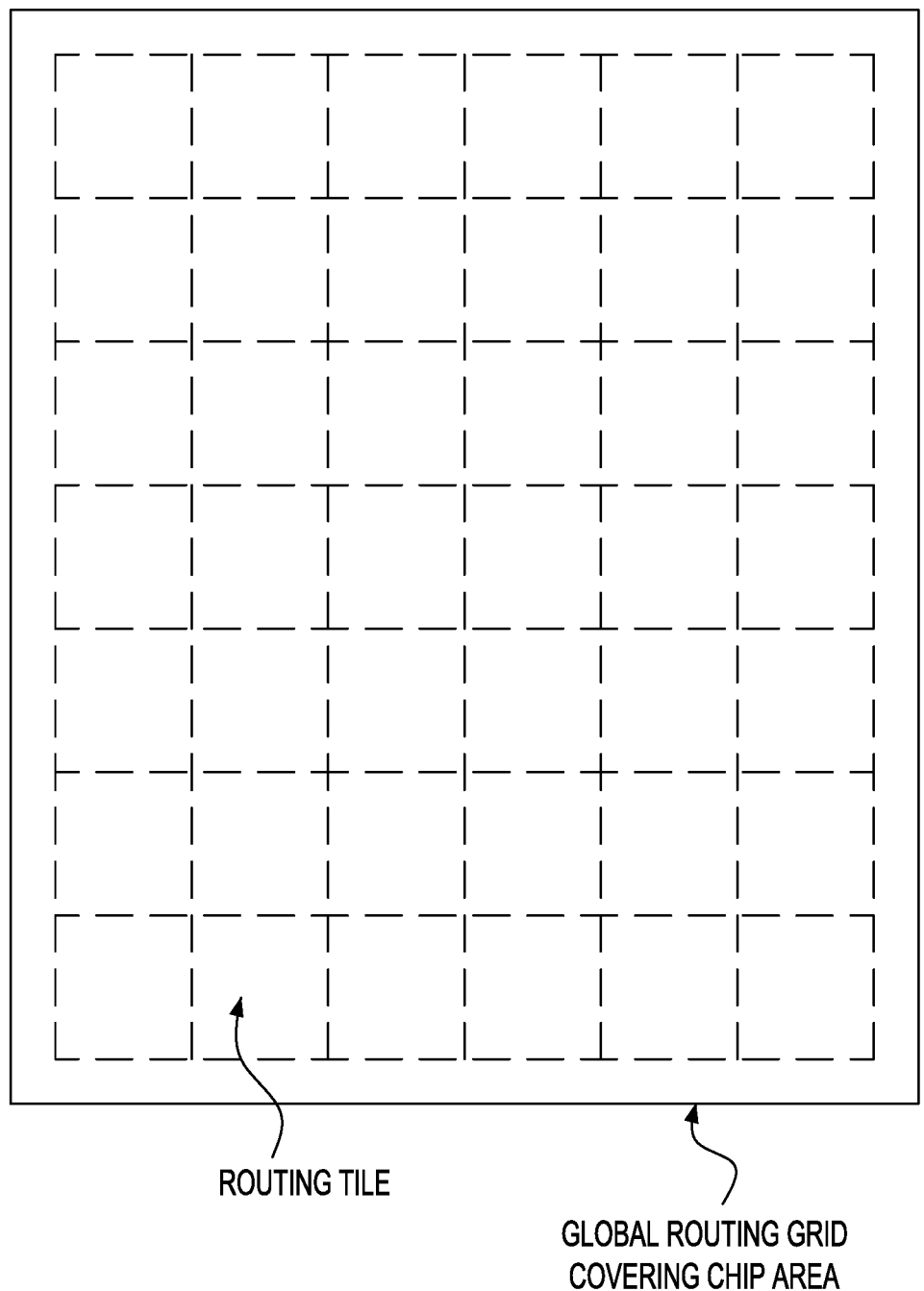
FIG. 6 illustrates a global routing grid covering the chip area.

Most wire routing tools today may execute routing in a two-step process. In the first step, a lower resolution approximate routing model is created and utilized in a global routing pass to develop routing guidelines and constraints for the detailed wiring step to follow. In this first step, global pass wires are not routed to specific wiring tracks, but rather may be confined to sets of wiring channels that represent the guidelines or constraints for eventual track assignment. At this step the chip area may be divided into rectangular routing tiles. FIG. 6 illustrates a global routing grid covering the chip area. The global routing grid is made up of individual routing tiles as indicated in FIG. 6. The globally routed wires may be assigned to these tiles. The number of wires assigned to each tile may not exceed the number of potential routing tracks of that tile. In the second step, called a detail routing pass, each net may be defined by routing through specific track assignments, which generally follow the guidelines established by the first step global pass constraints.

It is proposed to avoid noise much earlier in the design process in global routing, before detailed routing, and before a noisy timing slack has been computed and, further, before any traditional noise analysis has been done.

Predicting and avoiding (or at least lessening) coupling noise through early global routing has many difficulties. There is no accurate RC parasitics data available at global routing. There is no accurate driver data (i.e., accurate sizes of the transistors are not known) available at global routing. There is no information on actual neighboring wires available at global routing. And finally, accurate noise computation is not possible. The exemplary embodiments overcome these difficulties to result in a method which is an improvement over the prior art.

The exemplary embodiments guide global routing against configurations with a high probability of timing violations due to coupling noise.

During global routing, there are several knowns including: a routing tile with its characteristics such as total number of tracks available for routing (not all tracks in the routing tile are available for routing as some of the tracks may be used for other purposes such as power and ground networks), total number of wired tracks, wires assigned to the routing tile by the global router and wire congestion measured as the ratio of the number of wires assigned (to the routing tile) to the number of tracks available; information on the signal slews of potential aggressors including minimum signal slew, maximum signal slew, average signal slew and signal slew distribution; signal slew data on potential victim wires; ground capacitance estimates of potential victim wires; and potential coupling capacitances for different wire spacings. Hereafter, "slew" and "signal slew" may be used interchangeably.

Given these knowns during global routing, it is proposed to calculate a ground capacitance adjust of potential victim wires for coupling noise on delay to guide the global router with adjusted ground capacitance to reduce potential coupling noise effect on timing and the corresponding timing violations due to coupling noise.

Adjusted ground capacitance $C_{AG}$ of a wire is a sum of its actual ground capacitance $C_{GV}$ and the average ground capacitance adjust $C_{AVS}$ that takes into account a potential coupling noise effect by neighboring wires. $C_{AG} = C_{GV} + C_{AVS}$ The actual ground capacitance $C_{GV}$ may be estimated from wire length, the width, height and density of wires above and below the wire of interest, and characteristics of metal and dielectric layers in the integrated circuit. Advanced routing tools may use a ground capacitance calculator to estimate the actual ground capacitance for better prediction of signal delays in interconnect wires.

Adjusted ground capacitance is to be distinguished from ground capacitance adjust. In the following discussion, the exemplary embodiments deal with capacitance adjusts, which are increments of the actual ground capacitance value to take into account the impact of coupling noise on signal propagation delay through interconnects.

According to the exemplary embodiments, a probabilistic approach may be applied where an adjusted ground capacitance metric may be used to guide global routing.

In the exemplary embodiments, wire congestion, victim wire slew and potential aggressor wire slew may all be taken into consideration. With respect to congestion, the probability of having neighboring wires is estimated. Simple formulas for effective load capacitance adjusts are used for victim slew and potential aggressor slew. As to aggressor slew distribution, the probability of having an aggressor with a signal slew is estimated and an expected (average) value of a coupling effect is computed.

In general, combinations of aggressor wires that are too strong and victim wires that are too weak are to be avoided on routing tiles with too high wire congestion. Each wire is considered and analyzed as a potential victim wire. Aggressor wires are wires that impact victim wires. In one example, the victim wire may have a slow transition from 0 to 1 (slow slew) and the aggressor wire may have a faster transition from 0 to 1 (fast slew). Victim wires with slow slew are especially susceptible to coupling noise injected by neighboring aggressor wires with fast slew.

According to the exemplary embodiments, there is provided a method for calculating a ground capacitance adjust for a wire segment going through a given routing tile using a distribution of signal slews of wires belonging to the tile. It is not required in the exemplary embodiments to have knowledge of the actual location of the wires belonging to the tile.

Figure 7:
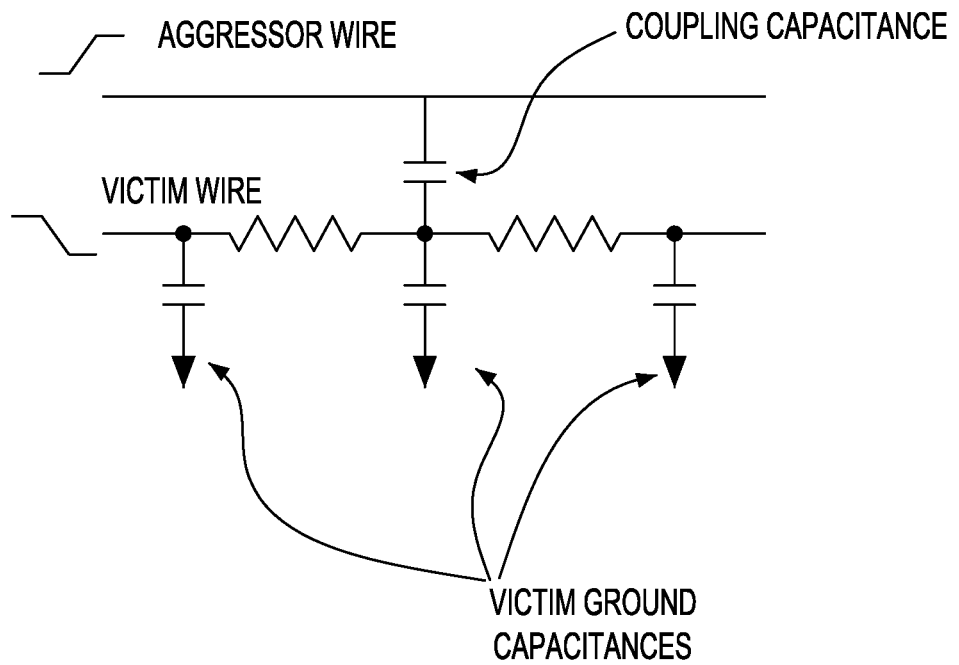
FIG. 7 illustrates one electrical model for a victim wire using coupling capacitance in the electrical model.

FIG. 7 illustrates one electrical model for a victim wire using coupling capacitance in the electrical model.

Figure 8:
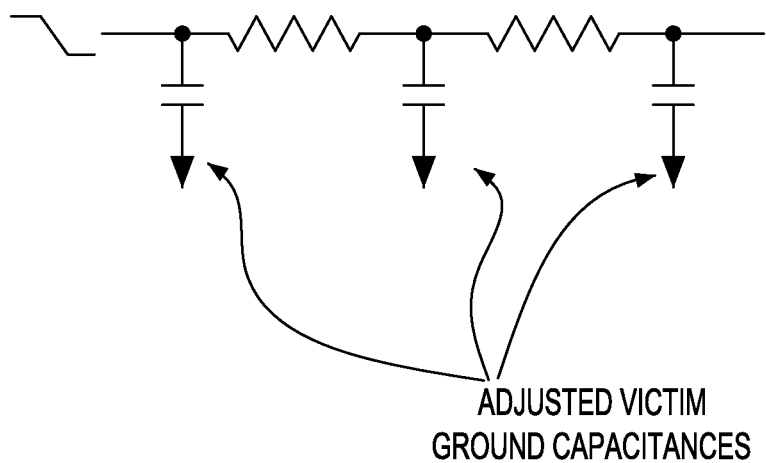
FIG. 8 illustrates an electrical model for a victim wire according to the exemplary embodiments in which coupling capacitance is removed from the electrical model.

FIG. 8 illustrates an electrical model for a victim wire according to the exemplary embodiments in which coupling capacitance is removed from the electrical model. However, the values of the ground capacitances are adjusted so that the wire delay computed using these ground capacitance adjusts may be the same as the wire delay computed from the electrical model with coupling capacitance illustrated in FIG. 7.

The global router uses the value of the ground capacitance for estimating delays of signals propagated through wires. The computed ground capacitance adjust helps the global router to predict wire delays more accurately taking into account potential coupling effects. Using this better prediction the global router produces a better chip layout with a fewer number of timing violations.

For achieving better trade-off between preventing coupling related timing failures and difficulty of chip wiring, the formula for adjusted ground capacitance may be extended by introducing a weight coefficient "w" of the ground capacitance adjust.

$$C_{AG} = C_{GV} + (w * C_{AVS})$$

The weight coefficient, whose default could be 1, is a means of influencing the eventual adjusted ground capacitance. The weight coefficient may be selected according to previous practice and results of chip design. Values of w higher than 1 exaggerate the impact of coupling effects, and therefore the resulting chip layout is expected to have fewer timing violations to be fixed on latter design stages. On the other hand higher values of w may result in higher difficulties in designing chip layout and the necessity to use a larger area for routing. The adjustment through the weight coefficient may be in response to empirical evidence that chips that have been built show that earlier analyses tend to underestimate or overestimate the influence of coupling capacitance. It could also be a means for a user of this method to make the routing more aggressive or more conservative with respect to how it avoids coupling, based on many factors, such as how early or late the user is in a design cycle, or on the results seen in these analyses. For instance, if the user is seeing too many noise violations to fix when analyzing a routed design, the user may choose to increase the adjusted ground capacitance by a percentage, of say, 30%, based on engineering judgement.

Further according to the exemplary embodiments, the method includes computing the ground capacitance adjust for a wire assuming its neighbors have signal slews from the distribution of slews for this tile for possible spacing values, computing a probability that a wire will have neighboring wires with those slews and located with those values of spacing and computing an average value of ground capacitance adjust by summing the computed ground capacitance adjusts multiplied by their probabilities.

For computing the wire ground capacitance adjust, each wire is considered as a potential victim of the coupling noise injected by its neighboring wires considered in that case as the aggressor wires.

More precisely, the ground capacitance adjust, denoted here as the average ground capacitance adjust ($C_{AVS}$), is calculated over possible spacing scenarios between wires of single spacing, double spacing and mixed spacing which is a mixture of single spacing between wires and double spacing between wires. As a practical matter, coupling noise between triple spaced wires is very low and is assumed to be zero for purposes of the ground capacitance adjust, although it should be understood that the exemplary embodiments may be expanded to include calculations for triple and wider spaced wires as well.

$C_{AVS}$ may be expressed as:

$$C_{AVS} = P_{DS} * C_{ADS} + P_{SS} * C_{ASS} + P_{MS} * C_{AMS}$$

where:

$C_{AVS}$ is the average ground capacitance adjust which averages among possible spacing scenarios and a distribution of aggressor signal slews. By averaging, it takes into account congestion's impact on coupling noise;

$C_{ADS}$, $C_{ASS}$, $C_{AMS}$ are average ground capacitance adjusts of the wire for double, single and mixed (one side single and other side double) spacing, respectively, between this wire and its potential aggressor wires. These average ground capacitance adjusts are computed by averaging among signal slews of all potential aggressor wires present on the tile.

$P_{DS}$, $P_{SS}$, $P_{MS}$ are probabilities of double spacing, single spacing and mixed spacing, respectively, of a victim wire from its potential aggressor wires.

The probabilities $P_{DS}$, $P_{SS}$, $P_{MS}$ may be estimated in several ways. One exemplary way is illustrated below.

Regarding the probabilities $P_{DS}$, $P_{SS}$, $P_{MS}$ first, it is assumed that the victim wire is assigned on one of the tracks. Assume $N_T$ equals the number of tracks in the tile, $N_W$ equals the number of wires in the tile and congestion of the tile is $N_W$ divided by $N_T$. $N_T$ may not equal $N_W$ since one or more of the tracks may be empty.

Figure 1:
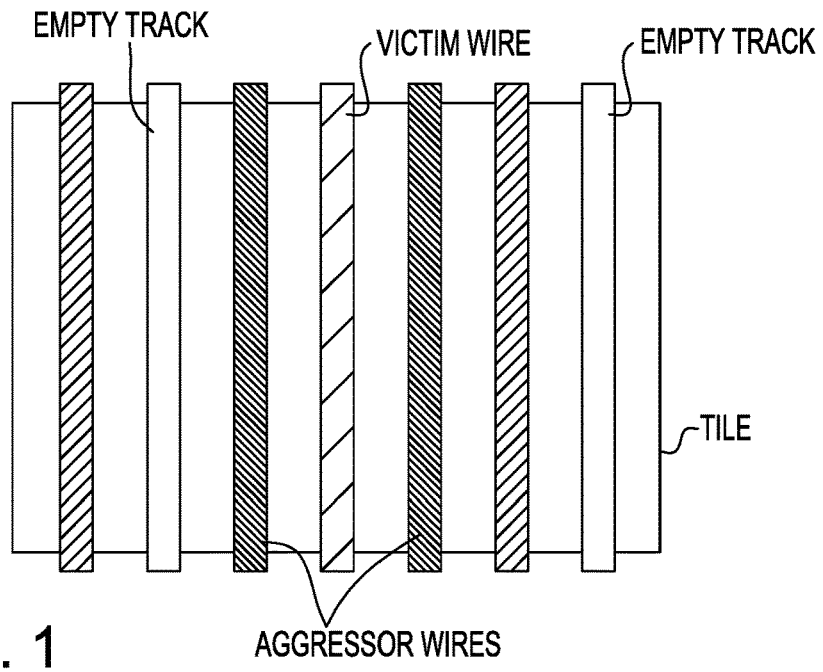
FIG. 1 is a schematic representation of a chip routing tile having wire tracks and wires filling some of the wiring tracks.

FIG. 1 is a schematic representation of a tile having $N_T$ wire tracks and $N_W$ wires filling some of the wire tracks. Also shown in FIG. 1 is a victim wire and aggressor wires on either side of the victim wire. Two of the wire tracks do not contain wires. The remaining wires may become victim wires or aggressor wires at a later time.

Figure 2:
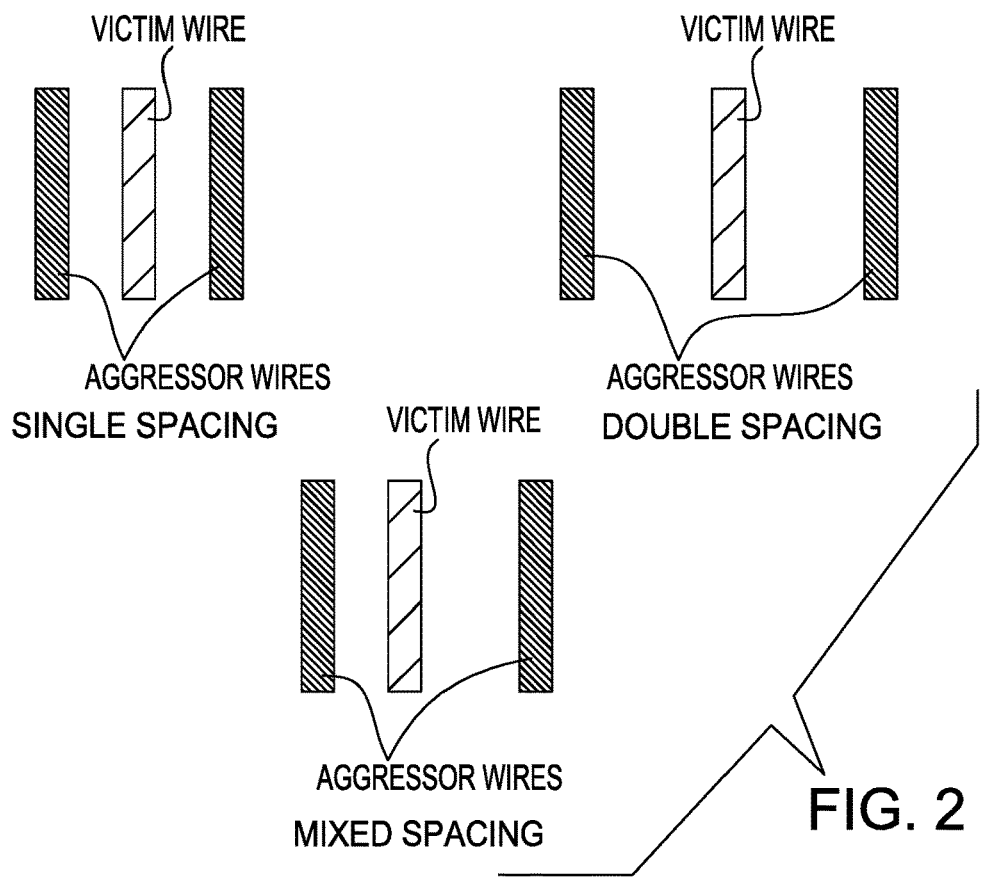
FIG. 2 is a schematic representation of single, double and mixed spacing between a victim wire and one or more aggressor wires.

FIG. 2 is a schematic representation of single, double and mixed spacing between a victim wire and one or more aggressor wires on a tile. A tile is a rectangular cell of the global routing grid of a circuit wiring design as illustrated in FIG. 6. While the tiles may be rectangular, they are most often square as shown in FIG. 6.

Then, the total number of aggressor track assignments may be written as where the aggressors of a victim wire may be considered from both sides of the victim wire:

$$(N_T-1)!/(N_T-N_W)!$$

The number of aggressor track assignments with double spacing between the victim and the aggressor wires may be written as:

$$(N_T-3)!/(N_T-N_W-2)!$$

The number of aggressor track assignments with single spacing between the victim and the aggressor wires may be written as:

$$(N_W-1)\cdot(N_W-2)\cdot(N_T-3)!/(N_T-N_W)!$$

The number of aggressor track assignments with mixed spacing (one side single and the other side double) between the victim and the aggressor wires may be written as:

$$2 \cdot (N_W - 1) \cdot (N_T - 3)! / (N_T - N_W - 1)!$$

Then, the probabilities $P_{DS}$, $P_{SS}$, $P_{MS}$ may be formulated as follows:

$$P_{DS} = \frac{(N_T - N_W) \cdot (N_T - N_W - 1)}{(N_T - 1) \cdot (N_T - 2)} \approx \frac{(N_T - N_W)^2}{N_T^2}$$

probability of double spaced victim;

$$P_{SS} = \frac{(N_W - 1) \cdot (N_W - 2)}{(N_T - 1) \cdot (N_T - 2)} \approx \frac{N_W^2}{N_T^2}$$

probability of single spaced victim;

$$P_{MS} = \frac{2 \cdot (N_W - 1) \cdot (N_T - N_W)}{(N_T - 1) \cdot (N_T - 2)} \approx \frac{2 \cdot N_W \cdot (N_T - N_W)}{N_T^2}$$

probability of mixed spaced victim.

All of the above formulas as well as others discussed herein may be approximate. As the goal is to estimate the impact of coupling noise on wire delays at the design stage when all data may be very uncertain, any reasonable approximation is useful.

It is possible to derive many other formulas for estimating probabilities of different types of wire spacing (or wire configurations). They may be more or less accurate, more or less complex. However, they may be similarly useful for computing the ground capacitance adjust to guide routing.

Moreover, it is possible to get formulas of probabilities of different kinds of spacing without computing those numbers of wire combinations with factorials. Previous designs may be analyzed to get numbers of different wire configurations in their routing tiles. The corresponding values of wire congestion may be obtained from the analysis of previous designs. Then, linear or polynomial or spline or any other type of approximate formulas of probabilities (frequencies) of each type of spacing may be derived as functions of the congestion. This approach may be even more accurate as it takes into account specific characteristics of the routing tool.

In the equation for $C_{AVS}$, $C_{ADS}$, $C_{ASS}$, $C_{AMS}$ are ground capacitance adjusts for double spacing, single spacing and mixed spacing of a victim from its potential aggressor wires, respectively.

In turn, the ground capacitance adjusts $C_{ADS}$, $C_{ASS}$, $C_{AMS}$ may be computed by averaging across all slews of potential aggressors. The ground capacitance adjusts $C_{ADS}$, $C_{ASS}$, $C_{AMS}$ also may be computed in several ways, One exemplary set of equations is described below.

$$C_{AXX} = \int_{S_{min}}^{S_{max}} C_{XX}(S) p(S) dS$$

where $C_{AXX}$ is either $C_{ADS}$, or $C_{ASS}$, or $C_{AMS}$.

$C_{XX}(S)$ is either $C_{DS}$, $C_{SS}$, $C_{MS}$ correspondingly for the ground capacitance adjusts computed for a given aggressor slew $S_A$, for double, single or mixed spacing. The ground capacitance adjusts (i.e., $C_{DS}$, $C_{SS}$, $C_{MS}$) take into account the effect of an aggressor slew on the change of victim delay due to coupling noise. Therefore the ground capacitance adjust $C_{XX}(S)$ is a function of aggressor slew $S_A$.

$p(S)$ is a probability density function of aggressor slews, defining their distribution and $S_{min}$, $S_{max}$ are minimum and maximum of aggressor slew values in the tile.

By probability density function, it is meant any function which may assign the probability of occurrence with each slew, which describes the relative likelihood for this variable to take on a given value, which could be derived from empirical data on similar circuit designs, or estimated by any means.

For the exemplary embodiments, the actual exact distribution of slews is known from the data on slews of wires assigned to the tile. The probability density function is simply the histogram of those slews. That is, the number of wires having each slew value. In the description that follows, the probability density function may be used in averaging formulas with sums.

However, it is possible to avoid using the exact distribution of slews because it can be too complex and time consuming. In that case, the approximate distribution of slews may be used which may be computed in many ways.

There are many ways to estimate probability distribution of signal slews. For example, mean and variance of slew distribution may be computed for a given tile, using well known formulas of statistics such as a Gaussian model and get the normal (Gaussian) distribution defined with the above computed mean and variance values. Instead of Gaussian model it is possible to use other statistical models. The statistical model may be selected to minimize the difference between the model and the actual wire distribution for the given tile or for a set of tiles or the whole chip.

Another way of getting slew distribution is use distributions computed from the data of previous designs.

Averaging across aggressor slews takes into account their aggressor slew distribution. The averaging can use either exact distribution of aggressor slews because from the assignment of wires to the routing tile all aggressor slews are known. So the averaging can be done exactly by transforming the integral into the sum as it is shown below. On the other hand, the actual slew distribution may be approximated with some model distribution (for example, Gaussian distribution), whose parameters (mean and variance) are computed from known slews of wires assigned to the tile.

Ground capacitance adjust $C_{XX}(S)$ is the ground capacitance producing the same delay effect as a coupling capacitance $C_{C,XX}$, where "XX" is for double spacing, single or mixed spacing, for a given victim signal transition with a victim slew $S_V$ and an aggressor slew $S_A$.

Further, the ground capacitance adjust $C_{XX}(S)$ as a function of aggressor slew may be computed from coupling capacitance for double, single and mixed spacing and using known victim slew $S_V$ and known potential aggressor slew $S_A$.

Late and early modes of timing analysis consider the latest and earliest arrival times of data signals. Therefore, they may use different values of the ground capacitance adjust such that late mode uses a positive adjustment and early mode uses a negative adjustment corresponding to the opposite and same directions of victim and aggressor signal transitions In the present analysis, the ground capacitance adjust $C_{XX}(S)$ may be computed using a bounding approximation that only victim and aggressor slews are considered. Discharging coupling capacitance through an upstream wire and a victim driver are ignored. Charging victim load capacitance through a downstream wire is also ignored. However, the presented methodology can be modified to take those effects into account as well.

There are many techniques to compute the coupling capacitance, ranging from the very simple and approximate to accurate solving of electro-static equations. In global routing, similar to the actual ground capacitance ($C_{GV}$), the coupling capacitance may be estimated from wire length, width, and height and the density of wires above and below the wire of interest, along with characteristics of metal and dielectric layers in the integrated circuit, often as a typical percentage of the total capacitance. This percentage may be pre-estimated using empirical evidence of typical coupling to ground capacitance ratios, or by making pessimistic assumptions, such as minimum lateral spacing on both sides of a victim wire and very dense wiring on the metal layers above and below.

The ground capacitance adjust $C_{XX}(S)$ models the effect of coupling noise on the delay of a victim net. As this effect depends on both the coupling capacitance and aggressor slew, the ground capacitance adjust is also a function of both the coupling capacitance $C_C$ and the aggressor slew $S_A$. The ground capacitance adjust $C_{XX}(S)$ is different for cases when a victim and its aggressors switch in the same direction and when they switch in opposite directions because the coupling effect is different for those two cases.

Figure 3:
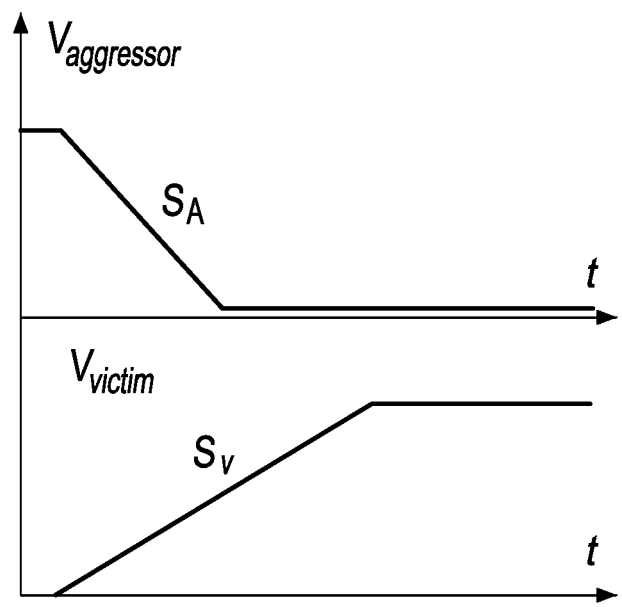
FIG. 3 is a schematic representation of aggressor and victim wires switching in the opposite direction.

FIG. 3 illustrates a schematic representation of aggressor and victim wires switching in the opposite direction, which is used for computing a ground capacitance adjust for the late mode timing. An aggressor wire switching in the opposite direction as its victim wire slows down the transition of the victim wire, affecting late mode timing.

Where the aggressor slew $S_A$ equals infinity (i.e., there is an infinitely slow transition from 0 to 1), then $C_{XX}(S)$ (i.e., the ground capacitance adjust) equals $C_{C,XX}$ (i.e., the coupling capacitance), there is no coupling noise.

Where the aggressor slew $S_A$ equals the victim slew $S_V$, then $C_{XX}(S)$ equals $2*C_{C,XX}$; there is symmetric coupling such that the victim and aggressor have the same characteristics. Two coupled wires are always both aggressor and victim simultaneously, but not only when their slews are equal. Each of them affects the transition of the other. At each moment of the analysis, we call a victim the wire for that we would like to evaluate the coupling effect of the other wire.

Where the aggressor slew $S_A$ equals 0 (i.e., there is an infinitely fast transition from 0 to 1), then $C_{XX}(S)$ equals $3*C_C$, which is an upper bound for linear ramp signals.

Using the above facts, the proposed formula for ground capacitance adjustment as a function of aggressor slew may be written generically as:

$$C_{XX}(S) = C_{C,XX}\left(1 + \frac{2 \cdot S_V}{S_A + S_V}\right)$$

and may be expanded for the double, single and mixed spacing cases as:

$$C_{DS} = C_{C,DS}\left(1 + \frac{2 \cdot S_V}{S_A + S_V}\right)$$

for double spacing $$C_{SS} = C_{C,SS}\left(1 + \frac{2 \cdot S_V}{S_A + S_V}\right)$$

for single spacing $$C_{MS} = C_{C,MS}\left(1 + \frac{2 \cdot S_V}{S_A + S_V}\right)$$

for mixed spacing

Figure 4:
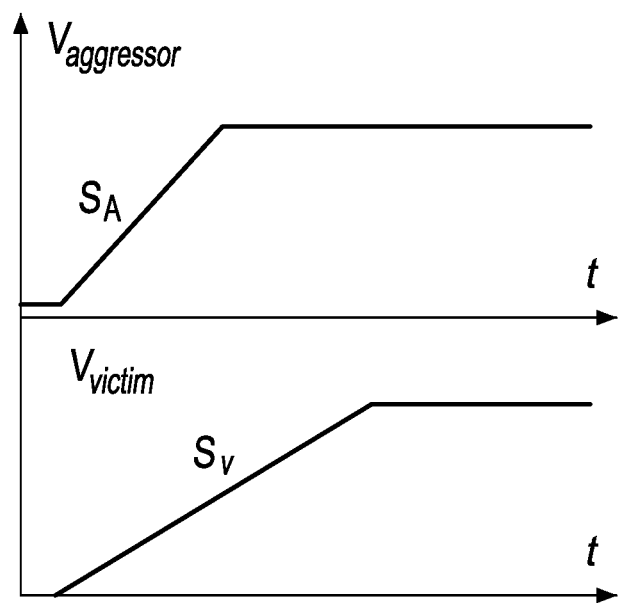
FIG. 4 is a schematic representation of aggressor and victim wires switching in the same direction.

FIG. 4 illustrates a schematic representation of aggressor and victim wires switching in the same direction, which is used for computing ground capacitance adjusts for early mode timing analysis. An aggressor wire switching in the same direction as its victim wire speeds up the transition of the victim wire, affecting early mode timing.

Where the aggressor slew $S_A$ equals infinity (i.e., there is an infinitely slow transition from 0 to 1), then $C_{XX}(S)$ (i.e., the ground capacitance adjust) equals $C_{C,XX}$ (i.e., the coupling capacitance), there is no coupling noise.

Where the aggressor slew $S_A$ equals the victim slew $S_V$, then $C_{XX}(S)$ equals 0; there is symmetric coupling such that the victim and aggressor have the same characteristics. Two coupled wires are always both aggressor and victim simultaneously, but not only when their slews are equal. Each of them affects the transition of the other. At each moment of the analysis, we call a victim the wire for that we would like to evaluate the coupling effect of the other wire.

Where the aggressor slew $S_A$ equals 0 (i.e., there is an infinitely fast transition from 0 to 1), then $C_{XX}(S)$ equals $-C_{C,XX}$, which is an upper bound for linear ramp signals.

The proposed formula for ground capacitance adjustment as a function of aggressor slew may be written generically as:

$$C_{XX}(S) = C_{C,XX}\left(1 - \frac{2 \cdot S_V}{S_A + S_V}\right)$$

and may be expanded for the double, single and mixed spacing cases as:

$$C_{DS} = C_{C,DS}\left(1 - \frac{2 \cdot S_V}{S_A + S_V}\right)$$

for double spacing $$C_{SS} = C_{C,SS}\left(1 - \frac{2 \cdot S_V}{S_A + S_V}\right)$$

for single spacing $$C_{MS} = C_{C,MS}\left(1 - \frac{2 \cdot S_V}{S_A + S_V}\right)$$

for mixed spacing

Averaging of the ground capacitance adjusts ($C_{AXX}$) may be done exactly by using data on actual slews of the potential aggressors, i.e. wires assigned to the routing tile of interest. The actual number of wires are always finite and the actual cases are always discrete. However, if the number of wires is too large and the computation of sums is too complex, some model distribution of slews (for example Gaussian) may be assumed, parameters of that distribution from the known values of slews may be computed and averaging by computing the integral shown above may be performed. This approach may be also helpful if the actual values of aggressor slews are not known but the parameters of their distribution are known or assumed.

Assume the tile has $N_W$ wires w1, w2, ..., $w_{NW}$ with slews $S_1, S_2, \ldots, S_{NW}$.

Assume wire $w_V$ is victim wire with slew $S_V$.

All other wires $w_i$ (i !=v) are potential aggressors.

Then, the average ground capacitance adjust for same direction transitions of victim and aggressor wires averaged across all aggressor slews for possible spacing scenarios may be written as:

$$C_{ADS} = \frac{2}{N_W - 1} \sum_{\substack{i=1 \\ i \neq v}}^{N_W} C_{C,DS} \cdot \left(1 - \frac{2 \cdot S_V}{S_i + S_V}\right)$$

for double spaced victim spacing;

$$C_{ASS} = \frac{2}{N_W - 1} \sum_{\substack{i=1 \\ i \neq v}}^{N_W} C_{C,SS} \cdot \left(1 - \frac{2 \cdot S_V}{S_i + S_V}\right)$$

for single spaced victim spacing; and $$C_{AMS} = \frac{2}{N_W - 1} \sum_{\substack{i=1 \\ i \neq v}}^{N_W} C_{C,MS} \cdot \left(1 - \frac{2 \cdot S_V}{S_i + S_V}\right)$$

for mixed spaced victim spacing.

Similar equations may be developed for the ground capacitance adjust for a victim and aggressor switching in the opposite directions.

Again, the possibility to have triple and higher spacing is ignored as coupling noise from triple and higher spacing is likely to be zero.

The exemplary embodiments are important in that they take into account both congestion of the wires in each tile and a statistical distribution of potential aggressor strengths. Both of these factors are very important. If the congestion is low then the detailed routing will be able to reduce coupling effects with proper spacing. A more subtle but very important effect is the statistical distribution of potential aggressor strengths and lengths. If all the wires have the same strengths, coupling issues are not severe. If there are only a few wires that are significantly stronger than the others, the detailed routing will be able to route them farther from weak wires. These examples show the importance of statistical distribution of wire strengths.

Moreover, the exemplary embodiments take into account that a wire can go through many tiles. So the average ground capacitance adjust metric ($C_{AVS}$) should be additive. A ground capacitance adjust is very good for a wire that can go through many tiles because the contribution of the average ground capacitance adjust metric ($C_{AVS}$) from each tile is accumulated by simple summation. Moreover this summation is performed by the global router itself when it computes the total capacitance of the wire going through several tiles or when it computes the delay of the wire going through several tiles.

Figure 5:
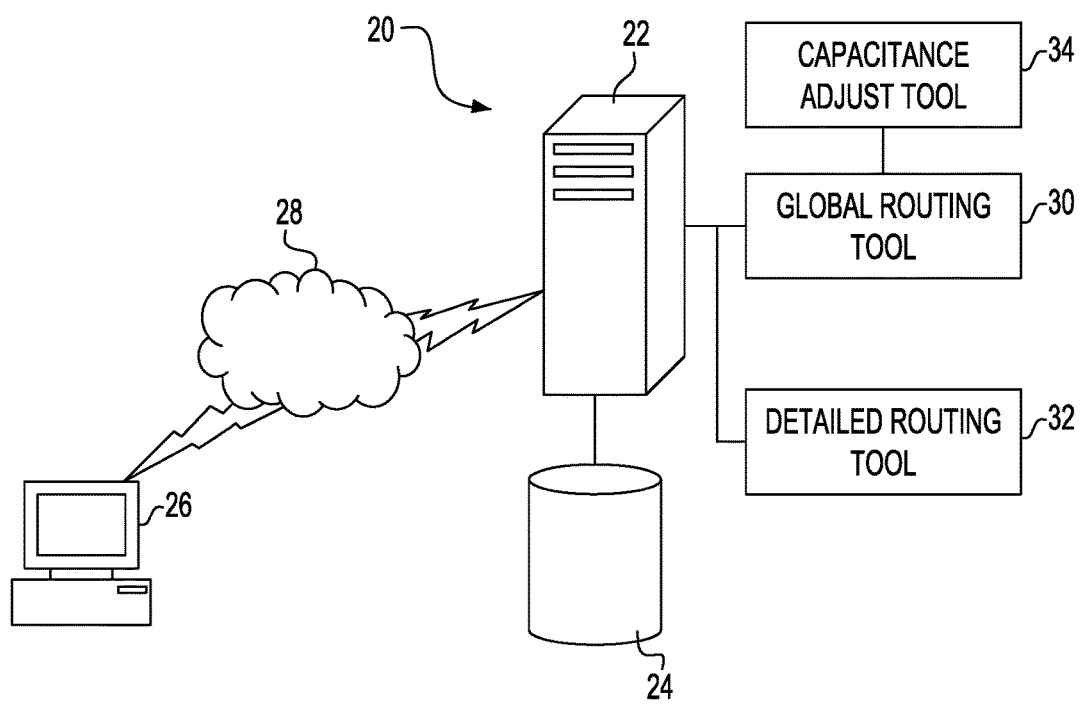
FIG. 5 is an exemplary embodiment of a system having a ground capacitance adjust input to the global routing tool.

FIG. 5 illustrates a system 20 for implementing the exemplary embodiments. The system 20 may include a host computing system 22 for performing various functions pertaining to electronic data automation (EDA) including but not limited to wire routing and timing analysis. Host computing system 22 may further include storage 24 for storing integrated circuit design data. Storage 24 may be local or remote storage.

A user desiring to perform any EDA function may access terminal 26 and connect to the host computing system by network 28. Network 28 may be a wired network or, as shown in FIG. 5, may be wireless and may include any communication means such as the cloud, internet, intranet and cellular to name a few.

Included within host computing system 22, or stored on storage 24, may be various EDA tools for wire routing including a global routing tool 30 and a detailed routing tool 32. There may also be a ground capacitance adjust tool 34 for inputting the average ground capacitance metric ($C_{AVS}$) of the exemplary embodiments into the global routing tool 30.

The global router places wires approximately by assigning them only to routing tiles. The goal of a global router is to route wires on chip in the way that helps a detailed router to place wires to their exact locations. The detailed router tries to route wires to their exact coordinates without moving them from tile to tile as soon as it is possible.

For correct chip operation the wire delays should be small enough to let the signals arrive at the right time. Therefore, the global router tries to satisfy this requirement either by minimizing wire capacitances, or by minimizing the wire delays, or by minimizing timing slacks computed by a timing analysis tool, which also uses wire delays. The wire delays are computed using estimated wire capacitances. So the wire capacitance is used either as a direct metric by the global router to find a better assignment of wires to routing tiles, or as a metric for computing wire delays to be used either directly by the global router or for computing timing slack by a timing tool. So the better the wire capacitances are estimated, the better will be the global routing, and the fewer timing violations there will be at later design stages to fix.

Adjusting ground capacitance to take into account coupling noise has two benefits. First, it directly improves the quality of a global routing by taking into account the effect of coupling noise. Second, the fact that the effect of coupling noise is expressed in terms of a ground capacitance adjustment allows using existing global routing tools, which are able to understand only ground wire capacitance but cannot directly use information on coupling capacitances, aggressor and victim slews or any other coupling noise characteristics.

Figure 9:
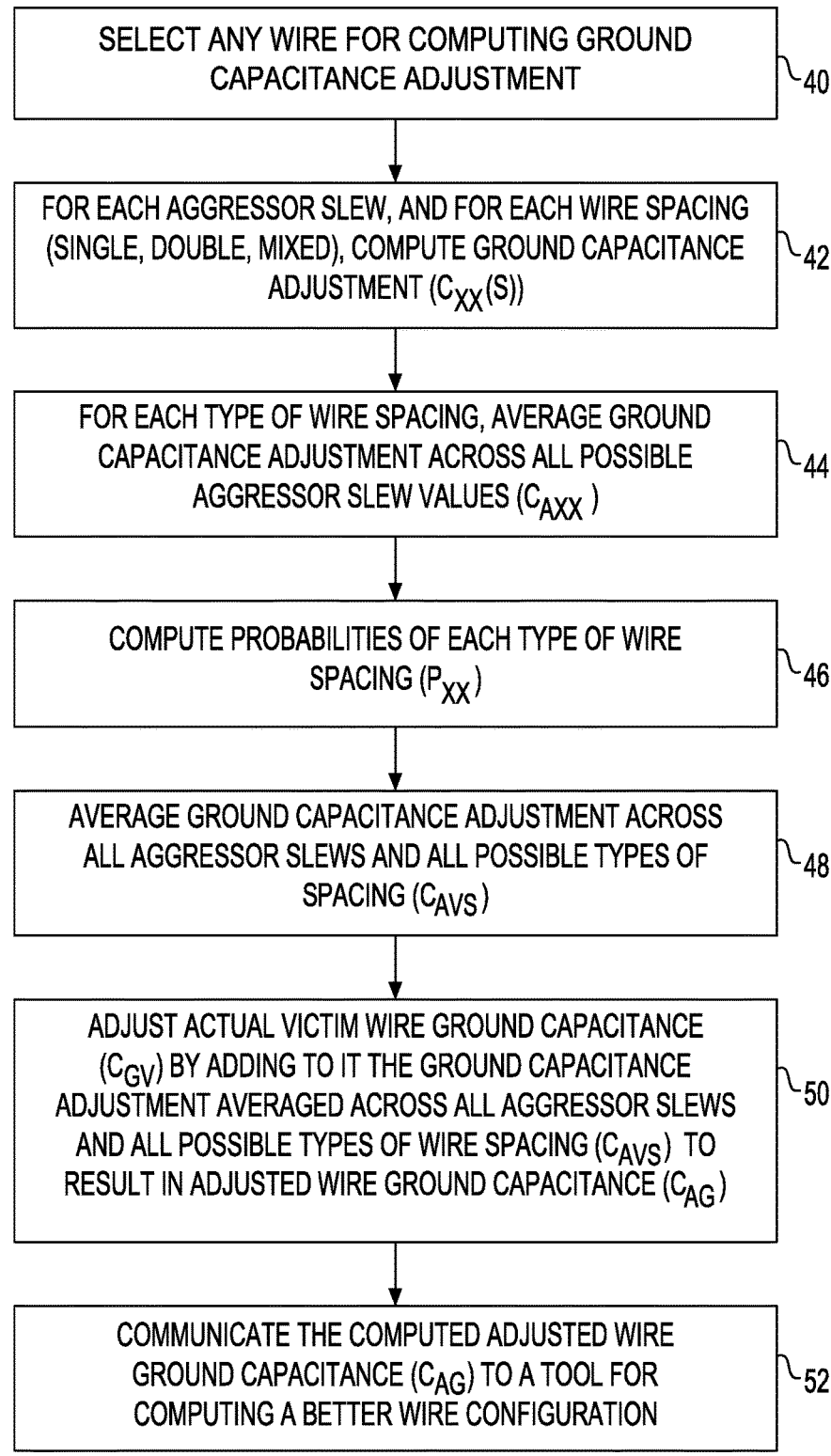
FIG. 9 is flow chart illustrating the exemplary embodiments of computation of a ground capacitance adjustment.

Referring now to FIG. 9, there is shown a flow chart summarizing the exemplary embodiments.

Initially, any wire may be selected for computing a ground capacitance adjustment, box 40.

Then, for each aggressor slew and for each possible wire spacing of single, double or mixed spacing, the ground capacitance adjustment, $C_{XX}(S)$, is computed as a function of aggressor slew, box 42.

For each type of wire spacing, the ground capacitance adjustment is averaged across all possible aggressor slew values to result in $C_{AXX}$ box 44.

The probabilities, $P_{XX}$, of each type of wire spacing may also be computed, box 46.

Then, the ground capacitance adjustment across all possible type of spacing are averaged to result in $C_{AVS}$, box 48.

The actual victim ground capacitance, $C_{GV}$, is adjusted by adding to it the ground capacitance adjustment averaged across all aggressor slews and all possible types of wire spacing to result in $C_{AG}$, box 50.

Finally, the computed adjusted wire ground capacitance, $C_{AG}$, is communicated to a tool for computing a better wire configuration, box 52.

The exemplary embodiments are preferably directed to global routing that takes into account a potential coupling noise effect by neighboring wires. It should be understood however, that the exemplary embodiments may have applicability to any other tool where there may be uncertainty of placement of wires that may take into account coupling capacitance. For example, for purposes of illustration and not limitation, the exemplary embodiments may have applicability, in addition to global routing, to chip floor planning, cell placement (i.e., placement of gates) and detail routing.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent to those skilled in the art having regard to this disclosure that other modifications of the exemplary embodiments beyond those embodiments specifically described here may be made without departing from the spirit of the invention. Accordingly, such modifications are considered within the scope of the invention as limited solely by the appended claims.

What is claimed is:

1. A computer implemented method for calculating a ground capacitance adjust for a wire segment going through a given routing tile comprising:
   providing the routing tile having a plurality of wires wherein the wire segment being a victim wire and neighboring wires being aggressor wires;
   computing a plurality of ground capacitance adjusts for the victim wire averaged across a plurality of aggressor slew values and across a plurality of spacing values between the victim wire and the neighboring aggressor wires to take into account a potential coupling effect by the neighboring aggressor wires, assuming a distribution of signal slews of wires belonging to the routing tile and assuming the neighboring wires of the victim wire have signal slews from the distribution of slews for the routing tile for the plurality of spacing values responsible for the coupling effect, to guide placement of the wire segment in the routing tile to avoid coupling noise; and
   manufacturing a chip based on the placement of the wire segment in the routing tile.

2. The method of claim 1 where computing of the plurality of ground capacitance adjusts is performed separately for the victim wire and the aggressor wires switching in the same direction and for the victim wire and the aggressor wires switching in the opposite direction to take into account the coupling effect slowing down opposite direction signal transitions and speeding up same direction signal transitions.

3. The method of claim 1:
   wherein computing the plurality of ground capacitance adjusts comprising:
   computing ground capacitance adjusts for the victim wire averaged across the plurality of aggressor wires slews, assuming coupling capacitance values corresponding to the plurality of values of spacing between victim and aggressor wires; and
   averaging the ground capacitance adjusts across the plurality of aggressor slews of wires present in the routing tile; and
   further comprising:
   averaging the ground capacitance adjusts across the plurality of the spacing values responsible for the coupling effect.

4. The method of claim 3 wherein the averaging of the ground capacitance adjusts across the plurality of aggressor slews comprises:
   summing the ground capacitance adjusts corresponding to the plurality of aggressor slews to result in a sum of ground capacitance adjusts; and
   dividing the sum of ground capacitance adjusts by the number of the plurality of aggressor wires.

5. The method of claim 3 wherein the averaging of the ground capacitance adjusts across the plurality of aggressor slews comprises:
   computing an integral of the aggressor slew capacitance adjusts multiplied by a probability density function of aggressor slew distribution.

6. The method of claim 3 where the averaging of the ground capacitance adjusts across the plurality of spacing values responsible for the coupling effect comprises:
   computing a plurality of probability values of potential wire spacing assuming a given number of routing tracks in the routing tile and a given number of wires requiring assignment to the routing tracks; and
   computing a sum of products of the ground capacitance adjusts corresponding to the wire spacing values multiplied by the probability of getting each of the plurality of spacing values by assigning wires to the routing tracks.

7. The method of claim 1 where the computed ground capacitances adjusts are sup-plied to a routing tool to assist in making decisions on assignment of wires to routing tiles.

8. The method of claim 1 where the computed ground capacitance adjusts are supplied to a design automation tool for estimating wire delay, taking into account the coupling effect.

9. The method of claim 8 where the design automation tool is a cell placement tool or a floor planning tool.

10. The computer implemented method of claim 1 further comprising a computer processing device to implement the computer implemented method.

11. A computer implemented method for calculating a ground capacitance adjust for a wire segment going through a given routing tile comprising:
    providing the routing tile having a plurality of wires wherein the wire segment being a victim wire and neighboring wires being aggressor wires;
    computing a plurality of ground capacitance adjusts for the victim wire averaged across a plurality of aggressor slew values to take into account a potential coupling noise effect by neighbors of the victim wire assuming a distribution of signal slews of wires belonging to the routing tile and assuming the victim wire's neighbors have signal slews from the distribution of slews for the routing tile for a plurality of spacing values of single spacing (CASS), double spacing (CADS) and mixed spacing of single and double spacing (CAMS);
    computing a first probability, PSS, that the victim wire will have neighboring wires on the routing tile with those signal slews and located with a single spacing;
    computing a second probability, PDS, that the victim wire will have neighboring wires on the routing tile with those signal slews and located with a double spacing;
    computing a third probability, PMS, that the victim wire will have neighboring wires on the routing tile with those signal slews and located with a mixed spacing;
    computing a first product of the computed ground capacitance adjust for the single spacing multiplied by the first probability;

computing a second product of the computed ground capacitance adjust for the double spacing multiplied by the second probability;
computing a third product of the computed ground capacitance adjust for the mixed spacing multiplied by the third probability;
computing an average value of ground capacitance adjust, CAVS, by summing the first product, second product and the third product;
inputting the average value of ground capacitance adjust into a tool to guide placement of the wire segment in the routing tile to avoid coupling noise; and
manufacturing a chip based on the placement of the wire segment in the routing tile.

12. The method of claim 11 wherein the plurality of ground capacitance adjusts comprises:

$$C_{ASS} = \int_{S_{min}}^{S_{max}} C_{SS}(S)p(S)dS$$

where CASS is the ground capacitance adjust for single spacing averaged across signal slews, CSS is the ground capacitance adjust for single spacing for an aggressor slew SA, p(S) is a probability density function of aggressor slews and SMIN and SMAX are minimum and maximum of aggressor slew values in the routing tile;

$$C_{ADS} = \int_{S_{min}}^{S_{max}} C_{DS}(S)p(S)dS$$

where CADS is the ground capacitance adjust for double spacing, CDS is the ground capacitance adjust for double spacing for an aggressor slew SA, p(S) is a probability density function of aggressor slews and SMIN and SMAX are minimum and maximum of aggressor slew values in the routing tile; and $$C_{AMS} = \int_{S_{min}}^{S_{max}} C_{MS}(S)p(S)dS$$

where CAMS is the ground capacitance adjust for mixed spacing, CMS is the ground capacitance adjust for mixed spacing for an aggressor slew SA, p(S) is a probability density function of aggressor slews and SMIN and SMAX are minimum and maximum of aggressor slew values in the routing tile.

13. The method of claim 12 wherein SV is victim slew and wherein for late mode timing;

$$C_{DS} = C_{C,DS}\left(1 + \frac{2 \cdot S_V}{S_A + S_V}\right)$$

for double spacing where CC,DS is a coupling capacitance for double spacing;

$$C_{SS} = C_{C,SS}\left(1 + \frac{2 \cdot S_V}{S_A + S_V}\right)$$

for single spacing where $C_{C,SS}$ is a coupling capacitance for single spacing;

$$C_{MS} = C_{C,MS}\left(1 + \frac{2 \cdot S_V}{S_A + S_V}\right)$$

for mixed spacing where $C_{C,MS}$ is a coupling capacitance for mixed spacing.

14. The method of claim 12 wherein SV is victim slew and wherein for early mode timing;

$$C_{DS} = C_{C,DS}\left(1 - \frac{2 \cdot S_V}{S_A + S_V}\right)$$

for double spacing where $C_{C,DS}$ is a coupling capacitance for double spacing;

$$C_{SS} = C_{C,SS}\left(1 - \frac{2 \cdot S_V}{S_A + S_V}\right)$$

for single spacing where $C_{C,SS}$ is a coupling capacitance for single spacing;

$$C_{MS} = C_{C,MS}\left(1 - \frac{2 \cdot S_V}{S_A + S_V}\right)$$

for mixed spacing where $C_{C,MS}$ is a coupling capacitance for mixed spacing.

15. The method of claim 11 further comprising inputting an actual victim wire capacitance, CGV, into the tool and adding the actual victim wire capacitance to the average value of ground capacitance adjust to result in an adjusted ground capacitance, CAG, such that CAG =CGV +CAVS.

16. The method of claim 11 further comprising:
inputting an actual victim wire capacitance, CGV, into the tool;
multiplying the average value of ground capacitance adjust by a weight coefficient, w, wherein the weight coefficient is selected based on previous results of a chip design, and adding the actual victim wire capacitance to result in an adjusted ground capacitance, CAG, such that CAG =CGV +(w *CAVS).

17. The method of claim 11 wherein the tool is a global routing tool.

18. The method of claim 11 wherein the tool is a detail routing tool.

19. The method of claim 11 wherein the tool is a chip floor planning tool or a cell placement tool.

20. The computer implemented method of claim 11 further comprising guiding placement of the wire segment in the routing tile to avoid coupling noise by a tool utiliz-ing the average value of the ground capacitance adjust, CAVS.

21. A computer program product for calculating a ground capacitance adjust for a wire segment going through a given routing tile having a plurality of wires such that one wire is a victim wire and at least one wire is an aggressor wire, the computer program product comprising a computer readable storage medium having program instructions embodied therewith, the program instructions executable by a computer processing device to cause the computer processing device to perform a method comprising:

computing a plurality of ground capacitance adjusts for the victim wire averaged across a plurality of aggressor slew values to take into account a potential coupling noise effect by neighbors of the victim wire assuming a distribution of signal slews of wires belonging to the routing tile and assuming the victim wire's neighbors have signal slews from the distribution of slews for the routing tile for a plurality of spacing values of single spacing (CASS), double spacing (CADS) and mixed spacing of single and double spacing (CAMS);

computing a first probability, PSS, that the victim wire will have neighboring wires on the routing tile with those signal slews and located with a single spacing;

computing a second probability, PDS, that the victim wire will have neighboring wires on the routing tile with those signal slews and located with a double spacing;

computing a third probability, PMS, that the victim wire will have neighboring wires on the routing tile with those signal slews and located with a mixed spacing;

computing a first product of the computed ground capacitance adjust for the single spacing multiplied by the first probability;

computing a second product of the computed ground capacitance adjust for the double spacing multiplied by the second probability;

computing a third product of the computed ground capacitance adjust for the mixed spacing multiplied by the third probability;

computing an average value of ground capacitance adjust, CAVS, by summing the first product, second product and the third product;

inputting the average value of ground capacitance adjust into a tool to guide placement of the wire segment in the routing tile to avoid coupling noise; and manufacturing a chip based on the placement of the wire segment in the routing tile.

22. The computer program product of claim 21 where computation of the plurality of ground capacitance adjusts is performed separately for victim wires and aggressor wires switching in the same direction and for victim wires and aggressor wires switching in the opposite direction to take into account the coupling effect slowing down opposite direction signal transitions and speeding up same direction signal transitions.

23. The computer program product of claim 21 wherein the program instructions executable by a computer processing device to cause the computer processing device to perform the method further comprising guiding placement of the wire segment in the routing tile to avoid coupling noise by a tool utilizing the average value of the ground capacitance adjust, CAVS.

* * * * *